Patented June 20, 1950

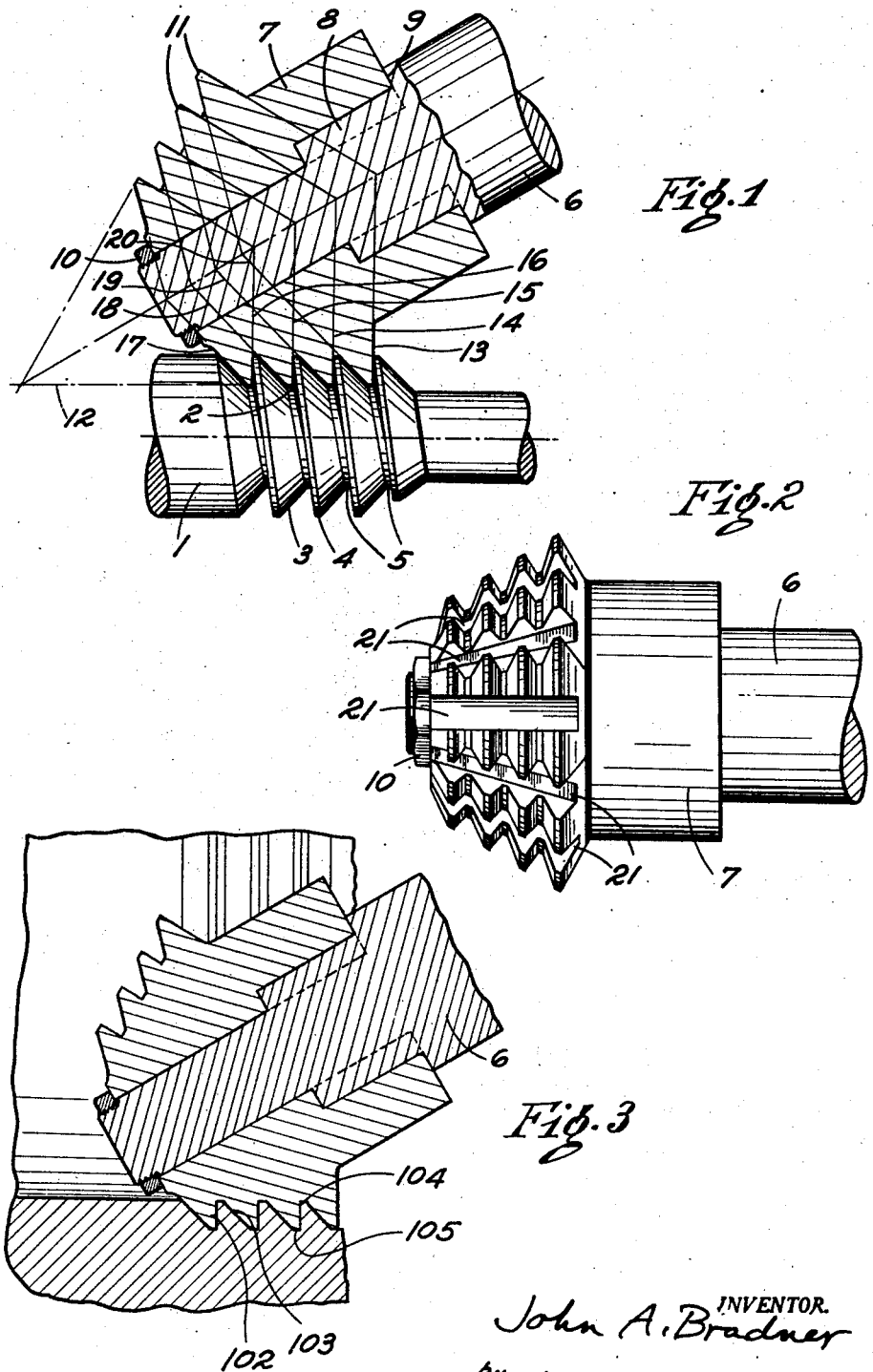

2,512,241

UNITED STATES PATENT OFFICE 2,512,241

TOOL

John A. Bradner, Shaker Heights, Ohio

Original application April 19, 1943, Serial No. 483,580, now Patent No. 2,410,261, dated October 29, 1946. Divided and this application August 19, 1946, Serial No. 691,589

7 Claims. (Cl. 29—103)

This invention relates to a tool capable of use in certain machining operations.

An object of the invention is to provide an improved tool capable of machining articles having irregular contours.

Another object of the invention is to provide an improved tool which may be used to machine grooves which have steep or undercut surfaces.

Another object of the invention is to provide an improved tool which may be used accurately to generate certain geometric surfaces.

Another object of the invention is to provide an improved tool which will easily and quickly perform certain machining operations.

Another object of the invention is to provide an improved tool which is capable of extreme accuracy of machining.

Another object of the invention is to provide an improved tool which may easily and accurately be manufactured.

Other objects will hereinafter appear.

This application is a division of my co-pending application Serial No. 483,580, filed April 19, 1943, and now Patent No. 2,410,261, granted October 29, 1946, in which certain methods which may be practiced by the use of the tool of this application are disclosed and claimed.

The invention will be better understood from the description of one practical embodiment of the tool, illustrated in the accompanying drawings which show its use in producing both external and internal threads of the buttress type. In these drawings:

Figure 1 is a fragmentary plan view of a tool and a portion of a work piece, taken on a plane parallel to that defined by the axes of the tool in work, parts being shown in section;

Figure 2 is a side elevational view of the parts illustrated in Figure 1; and

Figure 3 is a view similar to Figure 1, but showing the tool operating on an internal thread.

Among the many types of thread cross sections which have been developed practically all have been tapered in both directions, so that the cross section of the thread is some variation of an isosceles triangle the altitude of which is perpendicular to the axis of the threaded part.

Many variations in the proportions of this triangle, truncating the same, and providing rounded roots and crests have been tried, but practically all have now been superseded by some modification of a triangle having its sides disposed at angles of between 60° and 70° to the axis of the threaded piece.

Two types of thread only are generally recognized in which a surface is perpendicular to the axis of the part; namely the square thread and the buttress thread.

Threads with such truly radial surfaces possess many advantages in some situations, in that the axial thrust between two threaded parts is transmitted by compression alone between the two abutting surfaces and is normal thereto, precluding any tendency to wedge the parts relatively (as is the case in all inclined surfaces) and so provides a much better and more uniform distribution of this thrust.

Generally speaking, the buttress type of thread has all of these advantages in a single direction, while the square type has them in both directions. Consequently, if thrust is expected in only one direction, it can be handled satisfactorily by either type.

Neither square threads nor buttress threads are used very extensively in comparison with the great number of inclined threads, and this is largely because of difficulty which has heretofore been experienced in producing these threads, in comparison with the ease and cheapness in which the other forms may be manufactured.

It is an object of the present invention to render the production of the threads having truly radial surfaces as facile as that of those having inclined surfaces.

For convenient reference herein the distinctive surface of the square and buttress type threads which is that traced or defined by a line perpendicular to the axis of the threaded part in rotating about this axis at a uniform rate while it is moved along the axis also at a uniform rate, will be denominated by the term "radial" or "helico-radial." The surface of an ordinary type thread, being that traced by a line oblique to the axis of the work (generally, as above indicated, disposed at about 60° to this axis) which is rotated about this axis at a uniform rate and is transmitted also at a uniform rate, will be denominated as a "helico-conical" surface.

In considering the helico-radial type of surface, it will be apparent that, as this is cut into a cylindrical object, either externally or internally, when viewed in a direction perpendicular to the axis of the object, parts of the surface nearer the axis of the object recede behind and are hidden by some parts of the surface at a greater radial distance.

In other words, the surface, while not exactly undercut as this word is generally understood, possesses some of the characteristics of an undercut surface, and is extremely difficult of access by a cutter.

Of course, such a surface can be cut in an engine lathe, with a cutting tool having a straight edge adjusted to be perpendicular to the axis of the work.

This edge must be fed toward the axis of the work to its desired depth of cut, and then must be moved along the axis in synchronism with the rotation of the work, so that it traverses every part of the surface to be cut. If the desired depth of thread is greater than that permissible for a single cut, this operation must be repeated.

The use, however, of such a cutter having a single cutting edge is slow, the wear on the edge excessive, much time lost in sharpening and readjusting the same, and it is also difficult properly to support such a cutter, particularly when cutting internal threads which are at any substantial distance within the work piece.

With threads having two helico-conical surfaces of conventional form, there is no part of the helico-conical surface which is not convex and so laterally accessible to a cutter of other types, and such surfaces can be cut much more quickly by means of a rotating milling cutter than by the single lathe tool mentioned above.

Consequently, whenever they are to be produced in any substantial quantity, such threads are seldom cut by the slower turning operation and are quite frequently made by the now well known process of thread milling.

This process consists in mounting a circular cutter having a plurality of series of peripherally arranged cutting teeth on an axis parallel to that of the work, rotating the cutter at any desired cutting speed, rotating the work generally relatively slower with respect to the cutter, turning the work through only slightly more than a single revolution, and while the work is making one revolution moving it and the cutter relatively in the direction of the axis of the work a distance corresponding to the lead of the thread.

Not only is the cutting distributed over a relatively large number of cutting teeth, but the cutting speed of these teeth through the work can be adjusted for a maximum of efficiency without regard to the speed rotation of the work, which obviously was impossible with the screw cutting lathe type of operation.

It will be apparent that the cutting edges of the teeth which form the sides of the threads must lie in a plurality of conical surfaces. If the said edge of a series of teeth be made in a plane normal to the tool axis with intention of using this plane to define the helico-radial surface of a buttress or similar thread, it will be apparent that this plane will intersect the helico-radial surface along a line perpendicular to the work and tool axes, and at one side of this line the plane will extend within the metal which should be left on the tooth, so that the cutter gouges beyond the helico-radial surface and destroys the thread at this side of a line of intersection.

This situation is not improved by adjustment of the cutter axis relative the work, because the helico-radial surface is nowhere plane and nowhere convex, so that it may not be tangent to any plane, but if any line in a plane and this surface are brought into coincidence, the plane and this surface must intersect.

I have found that by providing a tool with a surface which is itself convex and is defined by straight lines, I can bring an element of this surface into a helico-radial surface without causing the two surfaces to intersect, and by so doing, produce a cutter of the milling type which will properly generate the helico-radial surface and may, therefore, be used for producing such surfaces on threads.

In order to cause an element of a conical surface to be normal to the axis of the work, it is necessary to incline the axis of the tool to that of the work by an angle complementary to that which the element of the cone makes with the tool axis.

This is illustrated in the figures of the drawing.

In Figures 1 and 2 of the drawing, the work is shown as a generally cylindrical piece 1 mounted in the work spindle of a thread milling machine to rotate about its own axis, and on this piece of work as shown is being generated a buttress thread having a helico-radial surface 2, a helico-conical surface 3, the two being slightly spaced apart by cylindrical surfaces 4 and 5 at the periphery or crest of the thread and at the root thereof, respectively.

The tool is shown as a milling cutter mounted on the tool spindle 6 and consisting of a cylindrical hub 7 and a tapered end provided with cutting teeth formed unitarily therewith. The hub 7 is splined to engage co-acting splines 8 formed on shaft 6 and abuts against a shoulder 9 on said shaft, being held thereagainst by means of a nut 10 threaded to the end of the shaft. The tapered end of the cutter includes four coaxial series of teeth 11.

It will be observed that the axis of the cutter is oblique to that of the work and is arranged to intersect this axis.

The crests of the cutter teeth 11 all lie in the surface of a cone defined by elements 12, which, as seen in the plane including the axes of the work and cutter and between these parts, lie parallel to the axis of the work.

The sides of the teeth contacting the crests are defined by two series of conical surfaces, the first series indicating the right hand side of the teeth (as seen in Figure 1) and being shown as four equally spaced cones 13, 14, 15, and 16 all coaxial with the tool spindle and all composed of elements perpendicular to the elements 12 of the crest defining cone.

The left hand sides of the series of the teeth are defined by four more cones 17 to 20 inclusive, coaxial with the tool spindle, the elements of which it will be noted are oblique to both elements 12 and to the axis of the tool spindle, so that all working surfaces of the cones are convex.

In other words, any section through the four annularly arranged lands of which the cutter teeth are formed produced by any plane spaced from the axis of the tool will be generally lenticular in shape.

The annular lands are separated to form the cutting teeth by longitudinally extending grooves or gashes 21, and it will be understood that the teeth behind the cutting edges may be provided with relief as is customary in other types of milling machines.

Inasmuch as the elements of cones 13 to 16 are perpendicular to elements of cone 12, it will be apparent that the teeth, when cutting deepest into the work, are operating on their left hand sides on lines oblique thereto, disposed to the work axis at an angle somewhat greater than the complement of the angle between the work and tool axes.

Although the radial distances of the four series of teeth on the cutter differ, it will be apparent that the cross sectional shape of the teeth in each series is identical with that in each of the others, and that the cutter may be readily formed as by turning, grinding, and the like, to produce the annular grooves between them and that the grooves 21 between the successive teeth of each series may conveniently be formed by milling, shaping, grinding, etc.

With the tool and work mounted as above described, the tool is rotated independently and the tool and work are fed relative to each other in the direction of the axis of the work by an amount synchronized with the rotation of the work and determined by the number and pitch of threads which it is desired to produce.

In other words, for a single pitch thread, as the work makes one revolution the cutter is moved axially with respect to the work by the distance between the successive series of teeth on the cutter. For a two pitch thread, the feed per revolution of the work would be twice the distance between successive series of teeth of the cutter, etc.

The cutter may be driven at any appropriate speed, which is independent of the speed of the rotation of the work, and so may rapidly cut metal away down to the full desired depth, so that ordinarily in threading a piece of the work it need make only slightly more than a single revolution.

While the invention has been described particularly as applied to a buttress type of thread, it may easily be used in the production of square threads, which, however, will require two separate operations, one producing the helical-radial surfaces on one side of the thread and the other that on the other side. These operations may conveniently be performed successively, by reversing the position of either the work or tool, or may be done simultaneously by using two separate tools set at oppositely disposed angles to the work axis.

The invention also may be used advantageously for helical surfaces which are very steep—too steep to be cut by the ordinary type of thread milling cutter—and can even be extended to produce undercut helical surfaces, and it will, therefore, be understood that the term "helico-radial," while accurately defined above as a single mathematical surface, should in the claims be regarded as including all helical surfaces which are so steeply inclined to the axis of the work as to require the application of the present invention when they are to be formed by means of a rotating tool.

While I have described the illustrated embodiment of my invention in some particularity, obviously many other embodiments, variations and modifications will readily occur to those skilled in this art, and I do not therefore limit myself to the precise details shown and described, but claim as my invention all embodiments, variations, and modifications coming within the scope of the appended claims.

I claim:

1. A milling cutter having a plurality of series of peripheral teeth, the crests of the teeth lying in a cone concentric with the cutter and one side of the teeth of each series lying in a cone also concentric with the cutter and defined by elements perpendicular to the elements of the first mentioned cone.

2. A tool having a plurality of working surfaces lying in a series of coaxial cones, elements of each of said cones in a plane including the axis of the tool being parallel and each series of working surfaces contacting another working surface, all the last mentioned working surfaces lying in a single cone which is coaxial with the first mentioned cones and are perpendicular to the elements of the first mentioned elements.

3. A tool having a plurality of cutting edges lying in a series of coaxial cones, elements of each of said cones in a plane including the axis of the tool being parallel and each cutting surface contacting another cutting surface, all the last mentioned cutting edges lying in a single cone which is coaxial with the first mentioned cones and the elements of which are perpendicular to the elements of the first mentioned cones.

4. A cutting tool having a peripherally arranged series of teeth, each tooth having two cutting edges, the edges of the teeth lying in two cones concentric with the tool, the intersecting elements of the cones being perpendicular.

5. A cutting tool having a plurality of series of peripherally arranged teeth, each tooth having a cutting edge lying in a common cone, and each tooth of each series having a second cutting edge intersecting and perpendicular to the first mentioned cutting edge, the second edges of the teeth of each series lying in a cone coaxial with the first mentioned cone.

6. A cutting tool having a plurality of series of peripherally arranged teeth, each tooth having a cutting edge lying in a common cone, and each tooth of each series having a second cutting edge intersecting and perpendicular to the first mentioned cutting edge, the second edges of the teeth of each series lying in a cone coaxial with the first mentioned cone, and each tooth having a cutting edge lying in a cone defined by elements oblique to the elements of the first mentioned cone and the series of cones defining the second mentioned cutting dges.

7. A tool of generally frustro-conical shape divided into a plurality of series of working surfaces by a series of generally annular grooves, one side of each of said grooves being conical, the elements of the cone being perpendicular to the intersecting elements of the cone defining the general contour of the tool.

J. A. BRADNER.

REFERENCES CITED

The following references are of record in the file of this patent:

UNITED STATES PATENTS

| Number | Name | Date |
|---|---|---|
| 1,846,640 | Head | Feb. 23, 1932 |
| 1,882,008 | Head | Oct. 11, 1932 |